(12) United States Patent
Hotani

(10) Patent No.: US 10,067,458 B2
(45) Date of Patent: Sep. 4, 2018

(54) WIRE HOLDING STRUCTURE, AND IMAGE FORMING APPARATUS INCLUDING WIRE HOLDING STRUCTURE

(71) Applicant: KYOCERA Document Solutions Inc., Osaka-shi, Osaka (JP)

(72) Inventor: Tomoya Hotani, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 74 days.

(21) Appl. No.: 15/249,210

(22) Filed: Aug. 26, 2016

(65) Prior Publication Data

US 2017/0063059 A1    Mar. 2, 2017

(30) Foreign Application Priority Data

Aug. 28, 2015 (JP) .................. 2015-169666

(51) Int. Cl.
    *H02G 3/04* (2006.01)
    *G03G 15/00* (2006.01)
    *F16L 3/02* (2006.01)
    *H02G 3/32* (2006.01)
    *G03G 21/16* (2006.01)

(52) U.S. Cl.
    CPC .......... *G03G 15/80* (2013.01); *G03G 21/1652* (2013.01); *H02G 3/32* (2013.01)

(58) Field of Classification Search
    CPC ............ H02G 3/04; H02G 3/32; G03G 15/80; G03G 21/1652; F16L 3/02
    See application file for complete search history.

(56) References Cited

U.S. PATENT DOCUMENTS

| | | | | |
|---|---|---|---|---|
| 4,911,392 A * | 3/1990 | Fast | ...................... | A47F 5/0068 248/304 |
| 5,339,967 A * | 8/1994 | Valiulis | .................. | A47F 5/0006 248/220.41 |
| 6,382,569 B1 * | 5/2002 | Schattner | .................. | F16L 3/04 248/220.41 |
| 6,996,943 B2 * | 2/2006 | Denier | .................. | E04B 2/7457 174/50 |
| 8,371,540 B1 * | 2/2013 | Medlin, Jr. | .............. | H02G 3/32 174/481 |

(Continued)

FOREIGN PATENT DOCUMENTS

JP    2007242690 A    9/2007
JP    2010130808 A    6/2010

*Primary Examiner* — Tan Le
(74) *Attorney, Agent, or Firm* — Alleman Hall Creasman & Tuttle LLP

(57) ABSTRACT

A wire holding structure includes a wire holding member and a support member. The wire holding member is formed from an elastic sheet member, includes a holding piece that can be bent in a direction perpendicular to a surface of the sheet member and is formed by forming a curved cut or a bent cut, and is configured such that a wire can be held in a gap that is formed when the holding piece is bent. The support member constitutes a part of a plate-like frame that constitutes a housing of an image forming apparatus. The support member includes a stepped portion and supports the wire holding member on an upper stage surface of the stepped portion in a state where the cut of the holding piece is oriented toward an edge of the upper stage surface, and a tip of the holding piece projects over the edge.

6 Claims, 7 Drawing Sheets

(56) References Cited

U.S. PATENT DOCUMENTS

2007/0023585 A1\* 2/2007 Judd ................ B60R 16/0215
  248/49
2007/0207640 A1   9/2007 Kawasaki et al.
2017/0063059 A1\* 3/2017 Hotani ................ G03G 15/80

\* cited by examiner

WIRE HOLDING STRUCTURE, AND IMAGE FORMING APPARATUS INCLUDING WIRE HOLDING STRUCTURE

INCORPORATION BY REFERENCE

This application is based upon and claims the benefit of priority from the corresponding Japanese Patent Application No. 2015-169666 filed on Aug. 28, 2015, the entire contents of which are incorporated herein by reference.

BACKGROUND

The present disclosure relates to a wire holding structure for holding a wire such as an electric wire, and an image forming apparatus including a wire holding structure.

An image forming apparatus such as a copier or a printer includes components installed therein, such as control objects to be controlled by a control portion, sensors for outputting detection signals to the control portion, and driving portions such as motors for driving components by electric power supplied from power source units. The control portion, the control objects, and the sensors are connected by signal lines, and the power source units and the driving portions are connected by power lines. The image forming apparatus includes a lot of control objects, sensors, and driving portions. As a result, wires such as signal lines and power lines are pulled around at many places in the apparatus, and are fixed to the inner frame or the like by wire holding members.

As a conventional wire holding member, there is known an electric wire holding member that is formed from an elastic sheet-like material.

SUMMARY

A wire holding structure according to an aspect of the present disclosure includes a wire holding member and a support member. The wire holding member is formed from an elastic sheet member, includes a holding piece that can be bent in a direction perpendicular to a surface of the sheet member and is formed by forming a curved cut or a bent cut, and is configured such that a wire can be held in a gap that is formed when the holding piece is bent. The support member constitutes a part of a plate-like frame that constitutes a housing of an image forming apparatus. The support member includes a stepped portion and is configured to support the wire holding member on an upper stage surface of the stepped portion in a state where the cut of the holding piece is oriented toward an edge of the upper stage surface, and a tip of the holding piece projects over the edge.

An image forming apparatus according to another aspect of the present disclosure includes the wire holding structure.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
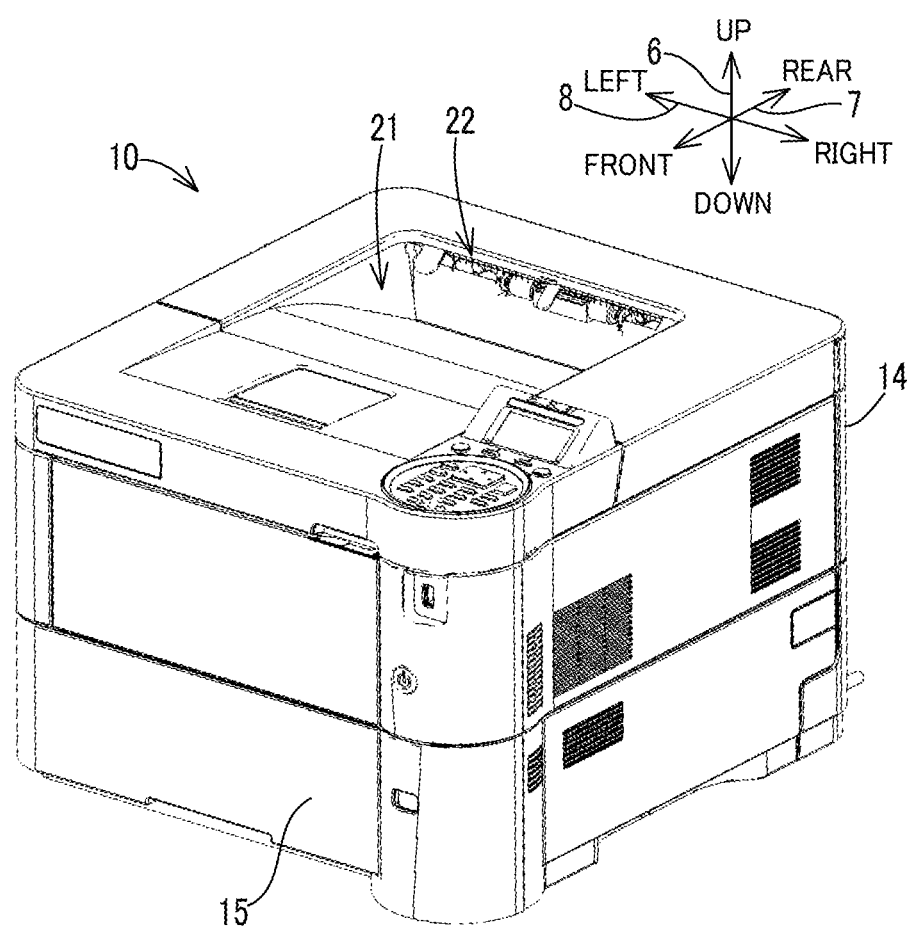
FIG. 1 is a diagram showing an image forming apparatus according to an embodiment of the present disclosure.

The following describes an embodiment of the present disclusure with reference to the attached drawings. It should be noted that the following embodiment is an example of a specific embodiment of the present disclosure and should not limit the technical scope of the present disclosure. For the sake of explanation in the following description, an up-down direction 6 is defined based on the state where an image forming apparatus 10 according to the embodiment of the present disclusure is installed on a flat surface (the state shown in FIG. 1). In addition, a front-rear direction 7 is defined on the supposition that the front side of the plane of FIG. 1 is the front. Furthermore, a left-right direction 8 is defined based on the image forming apparatus 10 viewed from the front side.

Figure 2:
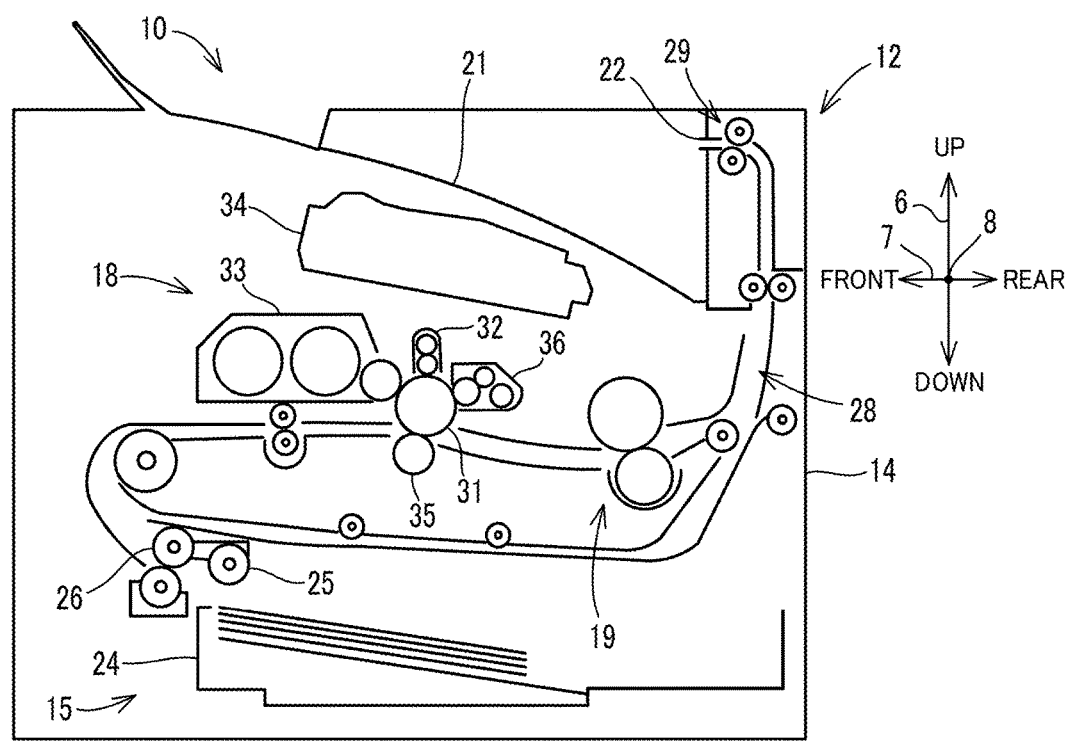
FIG. 2 is a diagram showing an internal configuration of the image forming apparatus.

The image forming apparatus 10 is shown in FIG. 1 and FIG. 2. The image forming apparatus 10 is a multifunction peripheral having a plurality of functions such as a printer function and a facsimile function. The image forming apparatus 10 prints an image on a print sheet based on input data, by using a print material such as toner. The image forming apparatus 10 is not limited to a multifunction peripheral, but may be any apparatus as far as it has a print function, and may be an image forming apparatus such as a printer, a facsimile, or a copier. Furthermore, it may be an apparatus for forming a color image, or an apparatus for forming a monochrome image.

The image forming apparatus 10 prints an image on a print sheet based on image data input from outside via a network communication portion (not illustrated). As shown in FIG. 2, the image forming apparatus 10 includes an electrophotographic image forming portion 18, a fixing portion 19, a sheet feed device 15, an LSU (Laser Scanning Unit) 34, a discharge unit 12, and a sheet discharge tray 21. These components are stored in a housing 14 that constitutes an inner frame and a cover of an outer frame of the image forming apparatus 10.

As shown in FIG. 2, the sheet feed device 15 is provided in a lowest part of the image forming apparatus 10. The sheet feed device 15 includes a sheet feed tray 24, a pickup roller 25, and a sheet feed roller 26. The sheet feed tray 24 stores, in a stack, print sheets on which images are to be formed by the image forming portion 18. The sheet feed tray 24 is supported by the housing 14. The pickup roller 25 and the sheet feed roller 26 are provided above a front side of the sheet feed tray 24. When an instruction to start feeding a print sheet is input to the image forming apparatus 10, the pickup roller 25 is rotationally driven by a conveyance motor (not illustrated), and a print sheet is fed from the sheet feed tray 24. The print sheet fed by the pickup roller 25 is conveyed by the sheet feed roller 26 toward the downstream side in the feeding direction.

The image forming portion 18 forms an image on a print sheet based on image data input from outside. The image forming portion 18 transfers a toner image to the print sheet by using developer that includes toner. The image forming portion 18 includes a photoconductor drum 31, a charging portion 32, a developing portion 33, a transfer portion 35, and a cleaning portion 36. When an image forming operation is started, the charging portion 32 charges the surface of the photoconductor drum 31 uniformly to a certain potential. In addition, the LSU 34 scans the photoconductor drum 31 with a laser beam based on the image data. Due to this, an electrostatic latent image is formed on the photoconductor drum 31. The developing portion 33 causes the toner stored in the developing portion 33 to adhere to the electrostatic latent image, thereby forming a toner image on the photoconductor drum 31. The transfer portion 35 transfers the toner image on the photoconductor drum 31 to the print sheet fed from the sheet feed tray 24. The print sheet to which the toner image has been transferred is conveyed to the fixing portion 19.

The fixing portion 19 is provided in rear of the image forming portion 18. The fixing portion 19 fixes the toner image having been transferred to the print sheet, to the print sheet by heat.

A conveyance path 28 is provided in rear of the fixing portion 19. The conveyance path 28 is formed by a pair of guide members (not illustrated). The conveyance path 28 is extended upward along the rear-side surface of the image forming apparatus 10, and reaches a paper sheet discharge outlet 22 of the discharge unit 12. A pair of discharge rollers 29 are disposed in the vicinity of the rear end of the conveyance path 28, and the print sheet with an image fixed thereto is discharged to the sheet discharge tray 21 by the pair of discharge rollers 29.

Figure 3:
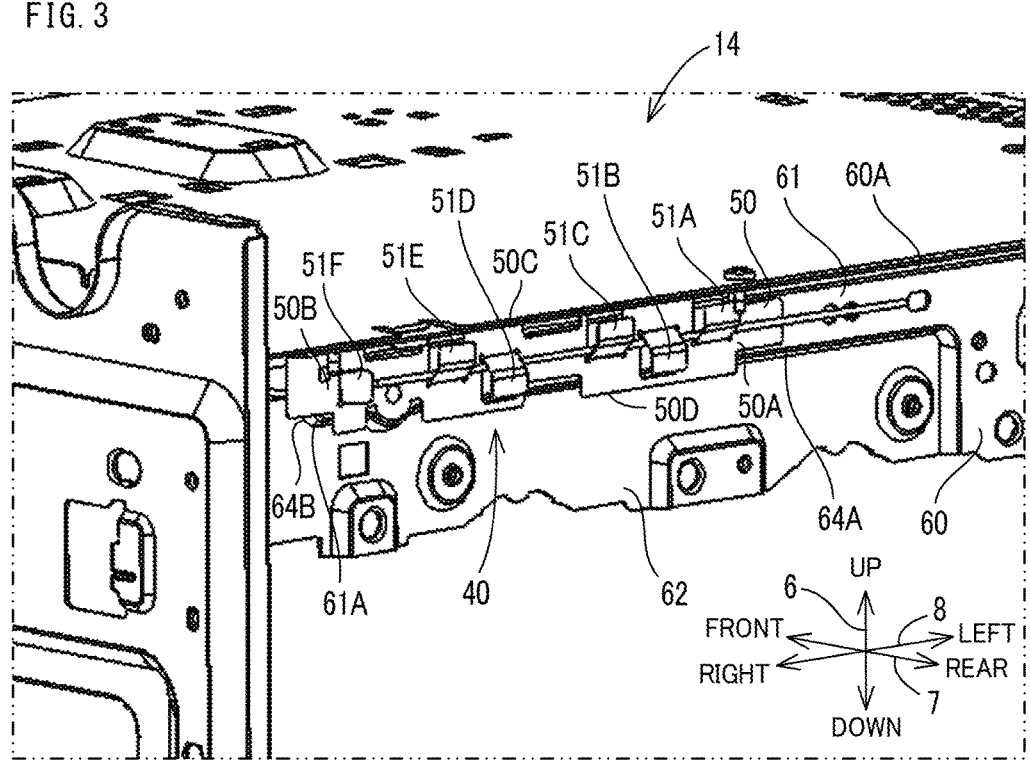
FIG. 3 is a diagram showing a state where a wire holding member is attached to a sheet-metal frame that constitutes a housing of the image forming apparatus.

FIG. 3 is a perspective view showing an inner frame of the housing 14. A sheet-metal frame 60 (an example of the plate-like frame of the present disclosure) that constitutes a part (a rear-side part) of the inner frame of the housing 14 is provided on the rear side of the housing 14. It is noted that in FIG. 3, only an upper-end part of the sheet-metal frame 60 is shown, and the other part is omitted.

Meanwhile, a conventional electric wire holding member is formed from a sheet-like material. However, the conventional electric wire holding member is formed by partially bending the sheet-like material. As a result, to manufacture the electric wire holding member, a die is required for the bending work to form a bent part. In addition, due to the presence of the bent part, a plurality of electric wire holding members are bulky to store, resulting in the loss of the merit of forming them from sheet-like materials. Furthermore, since the conventional electric wire holding member is three-dimensional, the electric wire holding member is attached to the inner frame of the image forming apparatus with low work efficiency. On the other hand, in spite of a simple configuration, a wire holding structure 40 of the present disclosure described below allows a wire holding member 50 to be attached easily to the image forming apparatus 10, and makes it possible to perform the work of having a wire held very easily.

As shown in FIG. 3, a wire holding member 50 is attached to an upper-end portion 61 (an example of the support member of the present disclosure) of the sheet-metal frame 60. The upper-end portion 61 constitutes an upper-end portion of the sheet-metal frame 60, and is a part of the sheet-metal frame 60. A wire holding structure 40 of the present disclosure is realized by the upper-end portion 61 and the wire holding member 50. That is, the wire holding structure 40 is composed of the upper-end portion 61 and the wire holding member 50.

In the sheet-metal frame 60, a recess portion 62 is formed under the upper-end portion 61. The recess portion 62 is formed to enhance the strength of the sheet-metal frame 60. The recess portion 62 is formed to be located away from an upper end 60A of the sheet-metal frame 60 vertically by a predetermined length, and is recessed toward the inside of the housing 14. In addition, the recess portion 62 also extends from a right-end portion 61A of the upper-end portion 61 in a region that is on the right side of the upper-end portion 61. As a result, a stepped portion 64A is formed at a lower end of the upper-end portion 61, and a stepped portion 64B is formed at the right end of the right-end portion 61A. The stepped portions 64A and 64B are inclined surfaces that erect from the side surface of the sheet-metal frame 60 when viewed from the recess portion 62. An upper stage surface of the stepped portions 64A and 64B is the upper-end portion 61 of the sheet-metal frame 60.

Figure 4:
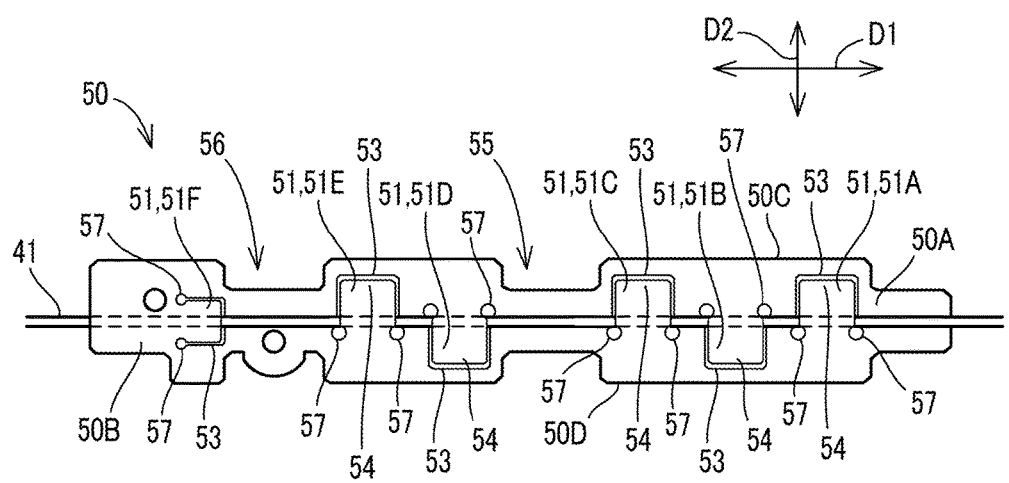
FIG. 4 is a diagram showing the wire holding member.

As shown in FIG. 4, the wire holding member 50 has a shape that is elongated in a direction. The wire holding member 50 is formed based on a narrow-width, plate-like sheet member that is elongated in a longitudinal direction D1. An elastic resin film may be used as the sheet member. In the present embodiment, a PET film that is 0.25 mm in thickness is used. The PET film is a sheet member formed from polyethylene terephthalate. The thickness of the applicable PET film is not limited to 0.25 mm, but may be in a range of approximately 0.125 mm to 0.25 mm.

The wire holding member 50 includes a plurality of holding pieces 51 (51A-51F). The holding pieces 51 are arranged in linear alignment in the longitudinal direction D1. The holding pieces 51 are formed by forming cuts 53 of a predetermined shape into the PET film. In the wire holding member 50 of the present embodiment, the holding pieces 51 are formed by forming the cuts 53 of approximately U-letter shape into the PET film. Since the holding pieces 51 are formed as described above, the holding pieces 51 can be bent in a direction perpendicular to the sheet surface (a direction perpendicular to the plane of FIG. 4). A wire 41 such as an electric wire is held by being inserted in a gap that is formed between a holding piece 51 and the sheet surface when the holding piece 51 is bent in the direction perpendicular to the sheet surface. It is noted that the cuts 53 may be formed by the laser processing or the press work.

In the wire holding member 50, a holding piece 51A is formed in an end portion 50A which is located on one side of the longitudinal direction D1 (the right-most side of the plane of FIG. 4). A holding piece 51B is formed on the left of the holding piece 51A in the plane of FIG. 4. Holding pieces 51C, 51D, 51E, and 51F are further formed in sequence in the stated order on the left of the holding piece 51B in the plane of FIG. 4. Holding pieces 51A-51C are disposed at predetermined intervals in the longitudinal direction D1. A narrowed portion 55 is formed between the holding piece 51C and the holding piece 51D, the narrowed portion 55 being formed by depressing opposite ends of the wire holding member 50 in a short-side direction D2 toward the center. The holding piece 51D is formed on the left of the narrowed portion 55 in the plane of FIG. 4. A narrowed portion 56 is formed between the holding piece 51E and the holding piece 51F, the narrowed portion 56 being formed by depressing an end of the wire holding member 50 in the short-side direction D2 toward the center. The holding piece 51F is formed on the left of the narrowed portion 56 in the plane of FIG. 4, and is formed in an end portion 50B of the wire holding member 50 which is on the other side in the longitudinal direction D1 (the left-most side of the plane of FIG. 4).

The holding pieces 51A, 51C, and 51E are formed in the same shape, and as shown in FIG. 4, the cuts 53 thereof are oriented in the short-side direction D2 of the wire holding member 50. Specifically, the cuts 53 of these holding pieces 51 are oriented toward an upper end portion 50C in FIG. 4.

In addition, the holding pieces 51B and 51D are formed in the same shape, and as shown in FIG. 4, the cuts 53 thereof are oriented in the short-side direction D2 of the wire holding member 50. Specifically, the cuts 53 of these holding pieces 51 are oriented toward a lower end portion 50D in FIG. 4. That is, the cuts 53 of the holding pieces 51A, 51C, and 51E and the cuts 53 of the holding pieces 51B and 51D are oriented in opposite directions. In the present embodiment, the holding pieces 51A-51E are disposed such that the cuts 53 of adjacent holding pieces 51 are oriented in opposite directions.

In addition, as shown in FIG. 4, the holding piece 51F is formed in a shape where the cut 53 thereof is oriented toward the inside along the longitudinal direction D1.

Protection holes 57 that are approximately circular are formed in each cut 53 of the holding pieces 51. The protection holes 57 are respectively formed at two ends of each cut 53, and are continuous to the cut 53. Due to the presence of the protection holes 57, the end portions of the cut 53 are prevented from being torn when the holding piece 51 is bent.

As shown in FIG. 3, the wire holding member 50 configured as described above is attached to the upper-end portion 61 in the state where the upper end portion 50C is aligned with the upper end 60A of the sheet-metal frame 60, the lower end portion 50D projects downward over the stepped portion 64A, and the end portion 50B projects rightward over the stepped portion 64B. The wire holding member 50 is, for example, adhered to the upper-end portion 61 by a double-faced tape or an adhesive. In the present embodiment, the wire holding member 50 is attached to the upper-end portion 61 in the state where the cuts 53 of the holding pieces 51B and 51D among the holding pieces 51 are oriented toward the lower end of the upper-end portion 61 (toward the stepped portion 64A), and tip portions 54 of the holding pieces 51B and 51D project downward over the stepped portion 64A. In addition, the wire holding member 50 is attached to the upper-end portion 61 such that the holding piece 51F is located directly on the right-end portion 61A of the upper-end portion 61.

As described above, the wire holding member 50 of the wire holding structure 40 according to the present embodiment is formed as a thin sheet. As a result, the wire holding member 50 is easy for a worker to handle, and can be easily attached to the upper-end portion 61. In addition, the wire holding members 50 are not bulky to carry or store.

Figure 5:
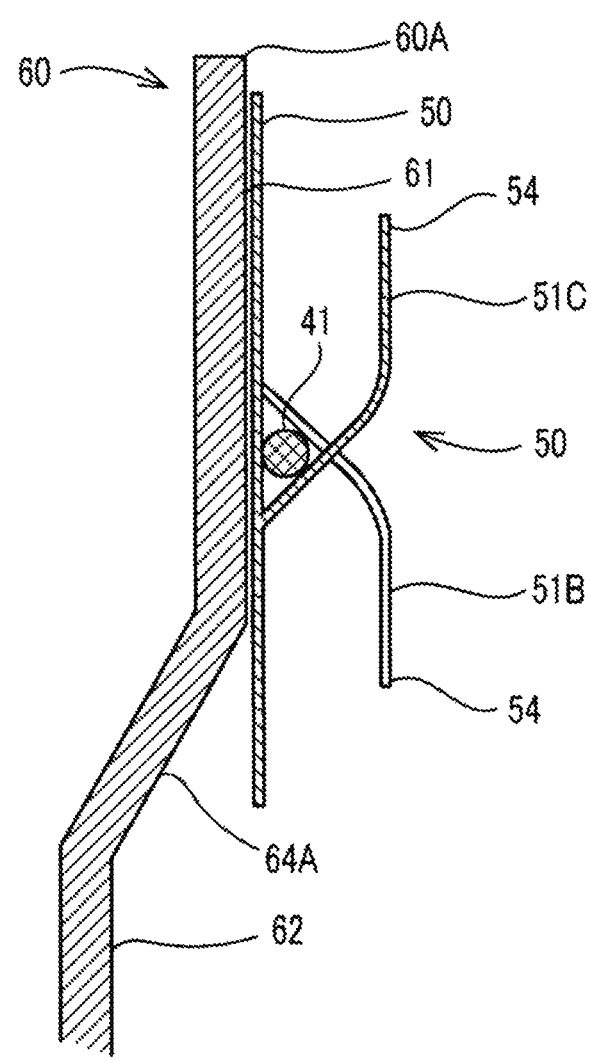
FIG. 5 is a cross-sectional view taken along a plane passing through the center of a holding piece of FIG. 3.

In addition, since the wire holding structure 40 has a configuration where the wire holding member 50 is attached to and supported by the upper-end portion 61, by raising a holding piece 51 in the direction perpendicular to the sheet surface of the wire holding member 50, a wire 41 can be held in a gap between the holding piece 51 and the sheet surface of the wire holding member 50. This enables the wire 41 to be held by the holding pieces 51 in a reliable manner, as shown in FIG. 5. It is noted that FIG. 5 is a schematic cross-sectional view of the sheet-metal frame 60 taken along a plane that passes through the center of the holding piece 51C of FIG. 3.

In particular, as described above, the wire holding member 50 is attached to the upper-end portion 61 in the state where the tip portions 54 of the holding pieces 51B and 51D project downward over the stepped portion 64A. As a result, the worker can form the gaps without bending the holding pieces 51B and 51D by pressing the lower end portion 50D of the wire holding member 50 toward the bottom of the recess portion 62 by using the stepped portion 64A. This enables the worker to have the wire 41 held by the holding pieces 51B and 51D easily. In addition, since the holding piece 51F is located directly on the right-end portion 61A of the upper-end portion 61, the worker can pull around the wire 41 between the end portion 50B and the stepped portion 64B by having the wire 41 held by the holding pieces 51 in sequence from the holding piece 51A and lastly passing the end portion of the wire 41 through the gap of the holding piece 51F to the back side. With this configuration, the worker can easily have the wire 41 held by the wire holding member 50.

Up to now, a description has been given of an example case where the wire holding member 50 is attached to the upper-end portion 61 of the sheet-metal frame 60. However, when, for example, the wire holding member 50 is attached to the positions shown in FIG. 6, the worker can have the wire 41 held easily, as well. Here, FIG. 6 is a diagram showing a state where the wire holding member 50 is attached to a sheet-metal frame 70 that is another inner frame of the housing 14.

Figure 6:
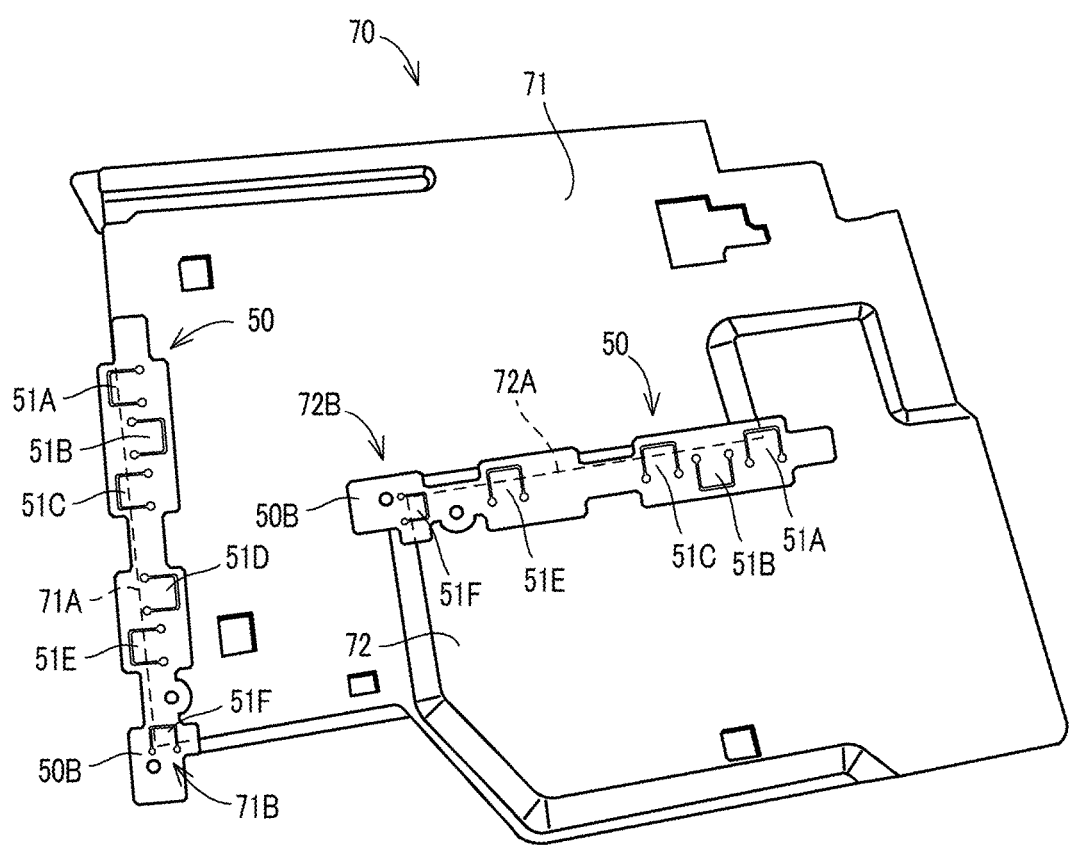
FIG. 6 is a diagram showing a state where the wire holding member is attached to another sheet-metal frame that constitutes the housing of the image forming apparatus.

As shown in FIG. 6, the sheet-metal frame 70 includes a lower-stage portion 71 (an example of the support member of the present disclosure) and a higher-stage portion 72 (an example of the support member of the present disclosure) that is higher than the lower-stage portion 71 by one stage. The wire holding member 50 is attached to each of the lower-stage portion 71 and the higher-stage portion 72.

With regard to the lower-stage portion 71, the wire holding member 50 is attached to the lower-stage portion 71 in the state where the cuts 53 of the holding pieces 51A, 51C, and 51E are oriented outward from an edge portion 71A of the lower-stage portion 71, and the tip portions 54 of the holding pieces 51A, 51C, and 51E project outward from the edge portion 71A of the lower-stage portion 71. In this case, the end portion 50B of the wire holding member 50 is disposed at an approximately right-angle corner portion 71B that is formed on an end portion of the edge portion 71A. Specifically, the end portion 50B projects outward from the corner portion 71B, and the holding piece 51F is disposed directly on the edge portion of the corner portion 71B. It is noted that the edge portion 71A corresponds to the stepped portion of the present disclosure.

With regard to the higher-stage portion 72, the wire holding member 50 is attached to the higher-stage portion 72 in the state where the cuts 53 of the holding pieces 51A, 51C, and 51E are oriented outward from an edge portion 72A of the higher-stage portion 72, and the tip portions 54 of the holding pieces 51A, 51C, and 51E project outward from the edge portion 72A of the higher-stage portion 72. In this case, the end portion 50B of the wire holding member 50 is disposed at a corner portion 72B that has an approximately right-angle corner and is formed on an end portion of the edge portion 72A. Specifically, the end portion 50B projects outward from the corner portion 72B, and the holding piece 51F is disposed directly on the edge portion of the corner portion 72B. It is noted that the edge portion 72A corresponds to the stepped portion of the present disclosure.

Even with the configuration of the wire holding structure 40 where the wire holding member 50 is attached to the above-described positions, it is possible to attach the wire holding member 50 to the sheet-metal frame 70 easily, and perform the work of having the wire 41 held very easily, as described above.

Figure 7A:
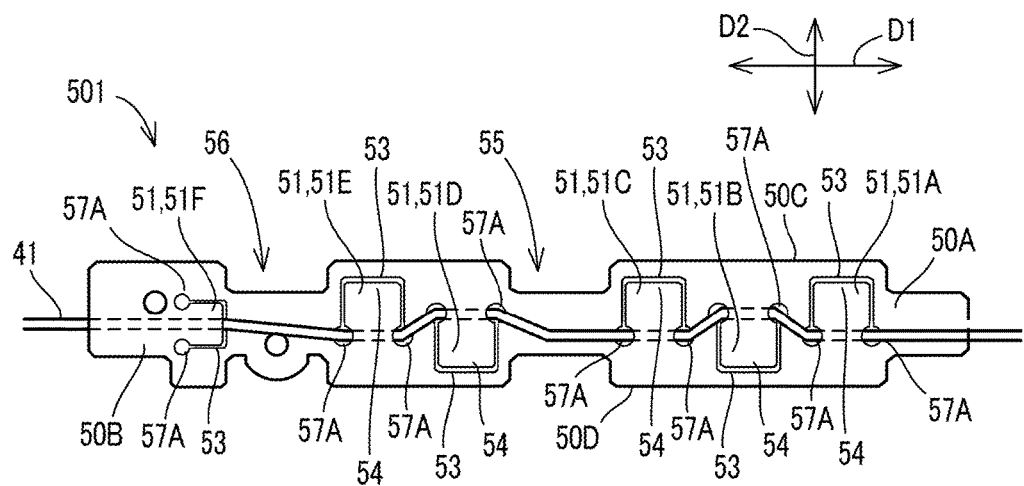
FIG. 7A and FIG. 7B are diagrams showing modifications of the wire holding member.

It is noted that as a modification to the wire holding member 50 of the above-described embodiment, a wire holding member 501 may be used which includes, as shown in FIG. 7A, protection holes 57A that are larger in size than the outer diameter of the wire 41 held by the holding pieces 51. In case of the wire holding member 501, the wire 41 can be passed through the protection holes 57A. This improves the holding force of the wire holding member 501 for holding the wire 41.

Figure 7B:
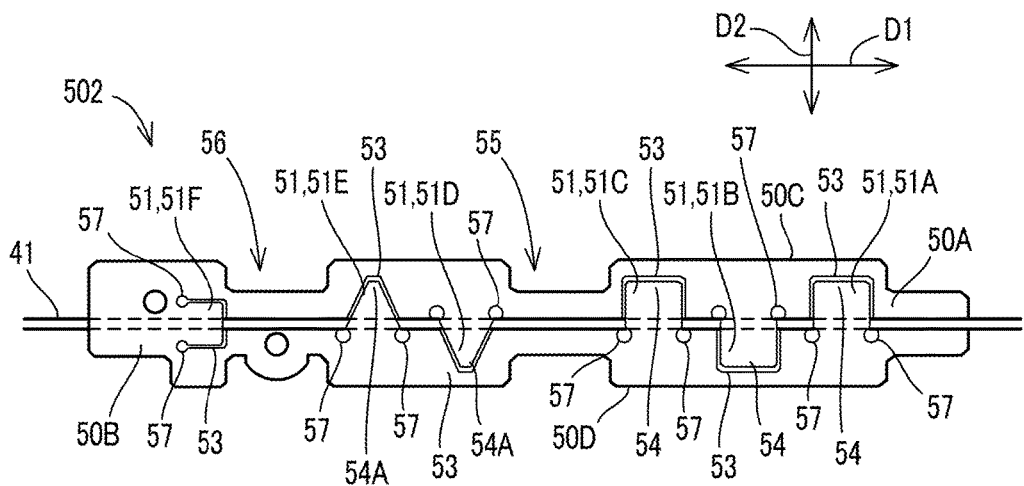

In addition, as a modification to the wire holding member 50 of the above-described embodiment, a wire holding member 502 may be used which includes, as shown in FIG. 7B, holding pieces 51 that are each formed to have an approximately acute angle. The holding pieces 51 are formed by forming, in the PET film, triangular cuts 53 that each have two sides that make the acute angle. It is noted that a triangular tip portion 54A may be formed in each of the holding pieces 51, but, as shown in FIG. 7B, the tip portion 54A may be formed in some of the holding pieces 51. In addition, the holding pieces 51 are not limited to the U-letter shape or the acute-angle shape, but may have any other shape as far as they are formed by forming curved cuts or bent cuts.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A wire holding structure, comprising:
a wire holding member elongated in a longitudinal direction, formed from an elastic sheet member, and including a plurality of holding pieces that can be bent in a direction perpendicular to a surface of the sheet member and are formed by forming curved cuts or bent cuts, and configured such that a wire can be held in gaps that are formed when the plurality of holding pieces are bent, the plurality of holding pieces being arranged in alignment in the longitudinal direction of the wire holding member and including two or more adjacent holding pieces, cuts of the adjacent holding pieces being oriented in a short-side direction of the wire holding member and oriented alternately in opposite directions in the short-side direction, end portions of each of the adjacent holding pieces being positioned approximately at a center of the wire holding member in the short-side direction; and
a support member constituting a part of a plate-like frame that constitutes a housing of an image forming apparatus, and including a stepped portion and configured to support the wire holding member on an upper stage surface of the stepped portion in a state where a cut of a holding piece in each pair of adjacent holding pieces in the two or more adjacent holding pieces is oriented toward an edge of the upper stage surface, and a tip of the holding piece in each pair of adjacent holding pieces projects over the edge.

2. A wire holding structure, comprising:
a wire holding member elongated in a longitudinal direction, formed from an elastic sheet member, and including three or more holding pieces that can be bent in a direction perpendicular to a surface of the sheet member and are formed by forming curved cuts or bent cuts, and configured such that a wire can be held in gaps that are formed when the three or more holding pieces are bent, the three or more holding pieces being arranged in alignment in the longitudinal direction of the wire holding member; and
a support member constituting a part of a plate-like frame that constitutes a housing of an image forming apparatus, and including a stepped portion and configured to support the wire holding member on an upper stage surface of the stepped portion, wherein
the stepped portion of the support member includes an approximately right-angle corner portion,
the wire holding member is supported by the upper stage surface of the stepped portion such that an end of the wire holding member in the longitudinal direction is disposed at the corner portion,
a cut of a holding piece among the three or more holding pieces that is provided close to the end of the wire holding member, is oriented inward in the longitudinal direction, and cuts of the other holding pieces are oriented in a short-side direction of the wire holding member and oriented alternately in opposite directions in the short-side direction, and
a cut of a holding piece in each pair of adjacent holding pieces in the other holding pieces is oriented toward an edge of the upper stage surface, and a tip of the holding piece in each pair of adjacent holding pieces projects over the edge.

3. The wire holding structure according to claim 1, wherein
holes that are each larger in size than an outer diameter of the wire are formed respectively at two ends of the cut.

4. The wire holding structure according to claim 1, wherein
the cut of the holding piece is triangular and has two sides that make an acute angle.

5. The wire holding structure according to claim 1, wherein
the sheet member is a PET film whose thickness is in a range of 0.125 mm to 0.25 mm.

6. An image forming apparatus, comprising the wire holding structure according to claim 1.

* * * * *